(12) United States Patent
Takahashi

(10) Patent No.: US 10,151,050 B2
(45) Date of Patent: Dec. 11, 2018

(54) NANOFIBER PRODUCTION APPARATUS

(71) Applicant: Zetta Nano Technology Co., Ltd., Suzhou (CN)

(72) Inventor: Mitsuhiro Takahashi, Yokohama (JP)

(73) Assignee: ZETTA NANO TECHNOLOGY CO., LTD., Suzhou, Jiangsu (CN)

( * ) Notice: Subject to any disclaimer, the term of this patent is extended or adjusted under 35 U.S.C. 154(b) by 142 days.

(21) Appl. No.: 15/277,907

(22) Filed: Sep. 27, 2016

(65) Prior Publication Data

US 2017/0016146 A1    Jan. 19, 2017

Related U.S. Application Data

(63) Continuation of application No. PCT/JP2014/082149, filed on Dec. 4, 2014.

(30) Foreign Application Priority Data

Mar. 28, 2014 (JP) .................... 2014-083156
Oct. 30, 2014 (JP) .................... 2014-233111

(51) Int. Cl.
  *D01D 5/00*   (2006.01)
  *D01D 5/098*  (2006.01)
  *D01D 5/14*   (2006.01)
  *B01D 39/16*  (2006.01)
  (Continued)

(52) U.S. Cl.
  CPC ....... *D01D 5/0985* (2013.01); *B01D 39/1623* (2013.01); *B01D 46/0001* (2013.01);
  (Continued)

(58) Field of Classification Search
  CPC .................................................. D01D 5/0985
  See application file for complete search history.

(56) References Cited

U.S. PATENT DOCUMENTS 5,141,699 A  *  8/1992  Meyer .................. D01D 5/0985
                                                  156/167
2001/0054783 A1   12/2001  Kobayashi
(Continued)

FOREIGN PATENT DOCUMENTS

JP    S62-085062 A    4/1987
JP    H05-59853 A     1/1993
(Continued)

OTHER PUBLICATIONS

JPO machine translation of JP 2013-185272, retrieved Apr. 12, 2018 (Year: 2018).*

*Primary Examiner* — Timothy Kennedy
(74) *Attorney, Agent, or Firm* — Alleman Hall Creasman & Tuttle LLP

(57) ABSTRACT

Provided is a nanofiber production apparatus which is capable of eliminating a need to use high voltage as in the ESD system to ensure high safety, and is free from influence of temperature and humidity at a production site. The nanofiber production apparatus comprises: a nanofiber generation device (2) comprising an air nozzle configured to generate high-speed and high-temperature air, and an ejector nozzle configured to eject a liquid polymer toward the high-speed and high-temperature air generated by the air nozzle; a collection device (6) provided on a downstream side of the nanofiber generation device (2) and configured to collect nanofibers generated by the nanofiber generation device (2); a suction device (8) provided on a downstream side of the collection device (6) and configured to suck gas; and a tubular-shaped guide member (4) provided on the downstream side of the nanofiber generation device (2) and on an upstream side of the collection device (6) and configured to allow the high-speed and high-temperature air to pass therethrough.

12 Claims, 12 Drawing Sheets

(51) Int. Cl.
*B01D 46/00* (2006.01)
*B82Y 40/00* (2011.01)
*B82Y 30/00* (2011.01)

(52) U.S. Cl.
CPC ......... *D01D 5/14* (2013.01); *B01D 2239/025* (2013.01); *B01D 2239/0622* (2013.01); *B01D 2239/0654* (2013.01); *B01D 2239/10* (2013.01); *B82Y 30/00* (2013.01); *B82Y 40/00* (2013.01); *D10B 2505/04* (2013.01)

(56) References Cited

U.S. PATENT DOCUMENTS

| | | | |
|---|---|---|---|
| 2003/0137069 A1 | 7/2003 | Reneker | |
| 2006/0273483 A1* | 12/2006 | Vakili | D01D 5/092 264/103 |
| 2007/0090555 A1 | 4/2007 | Roettger et al. | |
| 2014/0035177 A1* | 2/2014 | Lipton | D01D 5/18 264/8 |

FOREIGN PATENT DOCUMENTS

| | | | |
|---|---|---|---|
| JP | 2001-288670 A | 10/2001 | |
| JP | 2005-515316 A | 5/2005 | |
| JP | 2005-264353 A | 9/2005 | |
| JP | 2006-526083 A | 11/2006 | |
| JP | 2011-174214 A | 9/2011 | |
| JP | 2012-122176 A | 6/2012 | |
| JP | 2012107364 A * | 6/2012 | D01D 5/0069 |
| JP | 2013-185272 A | 9/2013 | |
| JP | 2013-230453 A | 11/2013 | |

\* cited by examiner

Collision of gas molecule

Slip flow

NANOFIBER PRODUCTION APPARATUS

TECHNICAL FIELD

The present invention relates to a nanofiber production apparatus.

BACKGROUND ART

Nanofiber textiles are used in various fields such as clothing, electronics, automobiles, medicine and building materials. In recent years, along with diversification in application of nanofiber products, there arises a need for nanofibers having a smaller fiber diameter.

In particular, a nanofiber product using nanofibers having a small fiber diameter is actively used in particular fields, such as the fields of filters, clothing, medical materials, biotechnologies, automobiles and building materials, by taking advantage of its features, such as large surface area, high void ratio, small pore diameter, high gas permeability and high fluid transmission rate.

SUMMARY OF INVENTION

Technical Problem

As a major technique for use in producing a nanofiber material comprising nanofibers, there have been known a melt-blown system and an electrospinning deposition (ESD) system.

In the melt-blown system, a liquid polymer is discharged or ejected from a nozzle and hot air is sent toward the ejected liquid polymer from its surrounding area to stretch the liquid polymer to produce nanofibers.

However, a nozzle for the melt-blown system is configured to blow out high-temperature gas from an outer peripheral side toward an inner peripheral side thereof. Thus, the high-temperature gas is converged and compressed at a tip of the nozzle, so that compression-expansion vibration of the high-temperature gas occurs just below the nozzle tip, thereby causing discontinuity of each fiber, resulting in a situation where produced nanofibers become short fibers. This poses restrictions on increasing a discharge (ejection) speed of the high-temperature gas from the gas ejector nozzle.

As above, due to the restrictions on increasing the ejection speed of the high-temperature gas from the gas ejector nozzle, the melt-blown system has difficulty in obtaining nanofibers having a fiber diameter of 1 μm or less, and involves a problem of being unable to freely increase a per-nozzle fiber production volume.

Moreover, in the melt-blown system, a region for blowing out the high-temperature gas is largely opened, and thereby it is difficult to sufficiently increase the ejection speed of the high-temperature gas. This is part of a reason for being unable to mass-produce nanofibers.

Next, a nanofiber production method based on the ESD (electrospinning deposition) system using a solvent-diluted polymer will be described below. FIG. 13 is a schematic diagram depicting one example of a nanofiber production apparatus based on the ESD system. As depicted in FIG. 13, the nanofiber production apparatus 401 based on the ESD system comprises: an ejection nozzle 402 configured to be supplied with a solvent-diluted polymer; a collection unit 404 disposed to face a tip of the discharge nozzle (ejection nozzle) 402; a high-voltage power source 406 for applying a high voltage between the tip of the ejection nozzle 402 and the collection unit 404; and a syringe pump (not depicted) for allowing the solvent-diluted polymer to be ejected from the tip of the ejection nozzle 402 at a constant flow rate.

The nanofiber production based on the ESD (electrospinning deposition) system is performed in the following manner. First of all, the syringe pump is filled with a liquid polymer prepared by dissolving a polymer in a solvent, and a high voltage is applied between the tip of the ejection nozzle 402 and the collection unit 404 by high voltage power source 406. Then, the syringe pump is activated to allow the liquid polymer to be ejected from the ejection nozzle 402 at a constant speed. The liquid polymer ejected from the ejection nozzle 402 is electrostatically charged to have the same polarity as that of the high-voltage power source, and is thereby stretched by electrostatic repulsion. Then, when the solvent is vaporized from the liquid polymer, and thereby an electric charge density thereof is increased, the stretching is accelerated to form nanofibers. The electrostatically charged nanofibers are transported toward the collection unit 404 according to a voltage difference, and adhered to the collection unit 404 electrostatically charged to have the opposite polarity. In this way, the nanofibers are deposited on the collector unit 404 to form a nanofiber product.

In the ESD system, only a small amount of nanofibers can be produced from the tip of one ejection nozzle 402. Therefore, aiming at mass production of nanofibers, it is attempted to spray a liquid polymer from a large number of ejection nozzles 402. However, the approach of providing a large number of ejection nozzles 402 requires a vast spray area to avoid electric field interference between respective ones of the ejection nozzles 402.

Moreover, if a flammable organic solvent is used as the solvent for the polymer, explosion of the solvent is likely to occur due to the high voltage. Therefore, it is necessary to use a water solvent or a non-flammable or less-flammable solvent. However, the use of this type of solvent spoils superiority of being able to perform the production at normal temperatures and pressures, which is an advantage of the ESD system.

As a result, the ESD system has suffered from a significantly high production cost of a nanofiber product.

Moreover, in the case where the ESD system is used to produce nanofibers in a narrow space, the liquid polymer is not formed as fibers, but a mass of droplet- or ball-shaped polymer particles is adhered onto a substrate. The formation of the mass of droplet- or ball-shaped polymer particles causes deterioration in material utilization efficiency, and the droplet- or ball-shaped polymer particles are likely to cause the occurrence of clogging of a resulting nanofiber layer and thus largely spoil mechanical properties of the nanofiber layer. In the case where a nanofiber layer produced in the above manner is used, for example, as a filter element for a filter such as a medium- or high-performance filter, a high-efficiency particulate air (HEPA) filter, an ultra-low particulate air (ULPA) filter, or a bag filter, there arises a problem such as deterioration in filter performance, for the following reasons.

As mentioned above, in the ESD system, a solvent rate is close to 90%, and a high voltage is used, so that mass production of nanofibers involves a risk of explosion. The ESD system also has many other problems such as variation in magnitude of electric discharge depending on temperature and humidity, and electric field interference.

Moreover, in the ESD system, the polymer is stretched by means of potential difference, and thereby electric charges are given to nanofibers. Thus, when the nanofibers having electric charges land on a substrate, a part of nanofibers having a fiber diameter of 300 nm or less are adhered to and deposited on the substrate in a planar shape centrally having a large hole as depicted in FIG. 14, because such thin nanofibers have relatively low rigidity. It is conceivable to spray a large amount of nanofibers in order to prevent the occurrence of the above hole. However, even if nanofibers are sprayed in a large amount, a large hole is still formed as depicted in FIG. 15, and only pressure loss is increased. Further, because a nanofiber material 1140 produced by the ESD system has a planar shape, contamination 1150 is liable to stick thereto, resulting in occurrence of clogging. As above, even though nanofibers having a fiber diameter of 300 nm or less could be produced by the ESD system, development of a highly-efficient, low-pressure loss filter expected to be achieved by using nanofibers has not been successfully conducted.

The present invention has been made in order to solve the above problems, and an object of the present invention is to provide a nanofiber production apparatus which is capable of eliminating a need to use high voltage as in the ESD system to ensure high safety, and is free from influence of temperature and humidity at a production site.

Solution to Technical Problem

The present invention provides a nanofiber production apparatus which comprises: a nanofiber generation device comprising an air nozzle configured to generate high-speed and high-temperature air, and an ejector nozzle configured to eject a liquid polymer toward the high-speed and high-temperature air generated by the air nozzle or toward the vicinity of the high-speed and high-temperature air; a collection device provided on a downstream side of the nanofiber generation device and configured to collect nanofibers generated by the nanofiber generation device; a suction device provided on a downstream side of the collection device and configured to suck gas; and a tubular-shaped guide member provided on the downstream side of the nanofiber generation device and on an upstream side of the collection device and configured to allow the high-speed and high-temperature air to pass therethrough.

In the present invention having the above feature, a stable airflow is formed from the air nozzle toward the suction device by the guide member. This makes it possible to prevent the nanofibers from scattering around the apparatus, and stably produce small-diameter (thin) nanofibers, without using high voltage. The non-use of high voltage makes it possible to improve safety, and become less likely to come under influence of temperature and humidity at production site.

Preferably, in the nanofiber production apparatus of the present invention, the liquid polymer is prepared by dissolving a polymer in a solvent, or by heating and melting a polymer.

Preferably, in the nanofiber production apparatus of the present invention, the guide member is made of a wood material, stainless steel (SUS), aluminum and polyethylene terephthalate (PET).

According to this feature, it becomes possible to prevent the nanofibers from adhering to the guide member, because each of the wood material, SUS, aluminum and PET is hardly electrostatically charged.

Preferably, the nanofiber production apparatus of the present invention further comprises a flow straightening device provided on the downstream side of the collection device.

According to this feature, it becomes possible to generate a more stable airstream, inside the guide member.

Preferably, in the nanofiber production apparatus of the present invention, the collection device supports a filter substrate, wherein the collection device is configured to allow nanofibers generated by the nanofiber generation device to be deposited on the filter substrate.

Effect of Invention

The present invention provides a nanofiber production apparatus which is capable of eliminating a need to use high voltage to ensure high safety, and is free from influence of temperature and humidity at a production site.

DESCRIPTION OF EMBODIMENTS

First of all, a nanofiber production apparatus of the present invention will be described in detail based on first and second embodiments thereof with reference to the drawings.

The first and second embodiments of the present invention relate to a nanofiber production method based on a system configured to heat high-speed air to a high temperature to cause volume expansion therein to thereby form high-speed and high-temperature air, and stretch a solvent-based liquid polymer by the high-speed and high-temperature air to thereby produce nanofibers (the inventors call this system a nanofiber generation means based on a solvent-dissolution type Zetta Spinning system).

The first and second embodiments of the present invention also relate to a nanofiber production method based on a system which comprises: a nanofiber generation device comprising an ejector nozzle configured to eject a molten polymer swelled by a solvent, and an air nozzle configured to generate high-speed and high-temperature air for use in stretching the molten polymer ejected from the ejector nozzle; and a collection unit configured to collect nanofibers produced by putting the liquid polymer on a flow of the high-speed and high-temperature air to thereby stretch the liquid polymer.

The first and second embodiments of the present invention further relate to a nanofiber filter element for a filter such as a medium- or high-performance filter, a HEPA filter or an ULPA filter, formed by integrally laminating the nanofibers produced by the above method, to one surface of a filter substrate of a non-woven or woven fabric comprising glass fibers, synthetic fibers, natural fibers or the like and having a fiber diameter of 0.3 to 50 µm and a thickness of 0.1 to 1.1 mm.

The first and second embodiments of the present invention further relate to a nanofiber filter element for a bag filter, formed by attaching a bonding medium consisting of a binder, molten fibers or an adhesive powder, onto one surface of a filter substrate of a non-woven or woven fabric comprising glass fibers, synthetic fibers, natural fibers or the like and having a fiber diameter of 1.0 to 100 µm and a thickness of 0.1 to 1.0 mm, and integrally laminating the nanofibers produced by the above method, onto the one surface of the filter substrate.

First Embodiment

With reference to the drawings, a nanofiber production apparatus according to the first embodiment of the present invention will be described in detail below.

Figure 1:
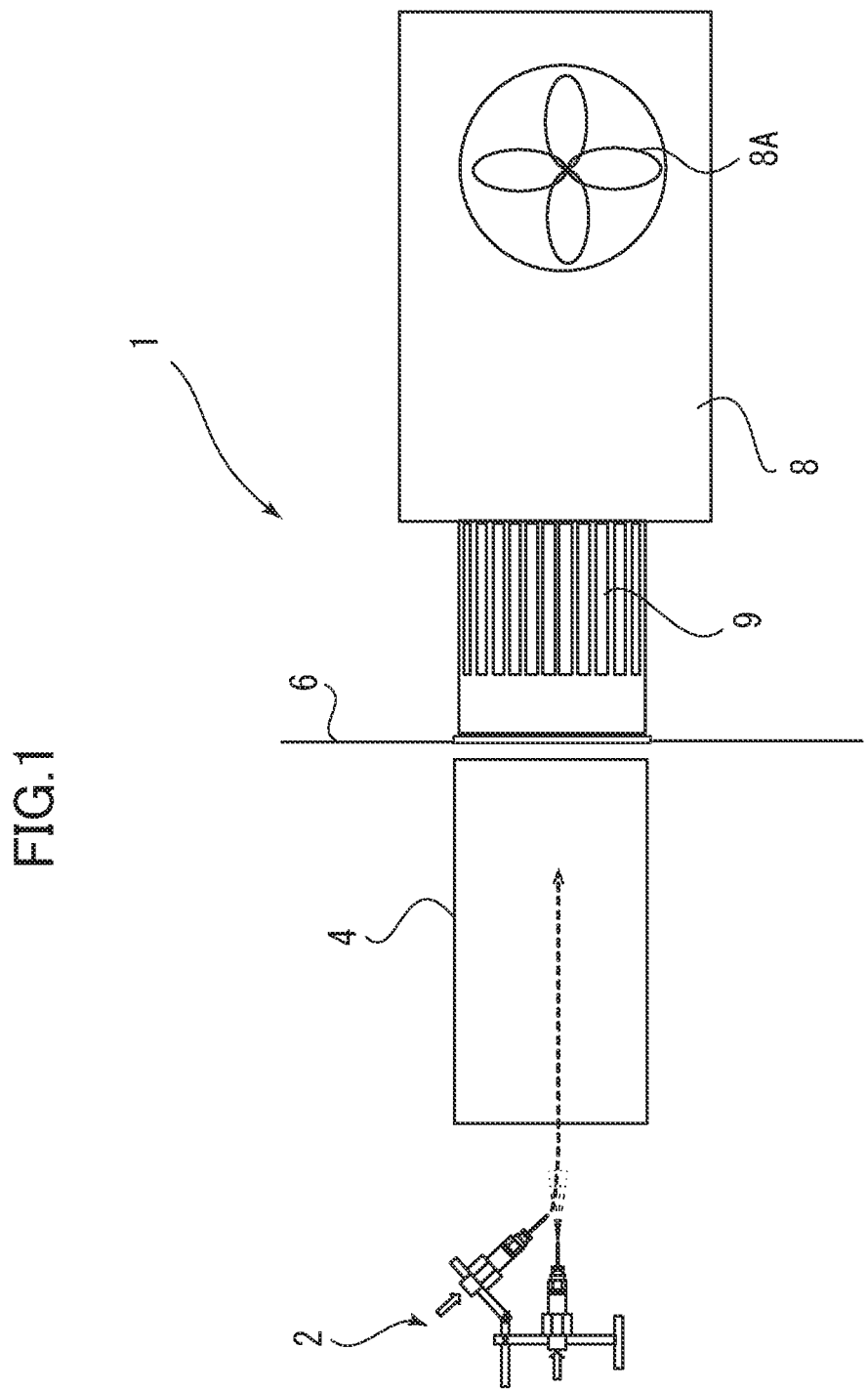
FIG. 1 is a schematic diagram depicting a configuration of a nanofiber production apparatus according to a first embodiment of the present invention.

FIG. 1 is a schematic diagram depicting a configuration of the nanofiber production apparatus according to the first embodiment. As depicted in FIG. 1, the nanofiber production apparatus 1 comprises a nanofiber generation device 2, a guide box 4, a collection device 6, a suction box 8 and a flow straightening member 9.

Differently from the ESD system, in the nanofiber production apparatus according to the first embodiment, nanofibers are not electrostatically charged. Thus, in the production apparatus according to the first embodiment, nanofibers generated from the nanofiber generation device are stretched and dried by sucking air.

The guide box 4 is a member formed in a tubular shape, and provided between the nanofiber generation device 2 and the suction box 8, i.e., provided on a downstream side of the nanofiber generation device 2 and on an upstream side of the collection device 6. The guide box 4 is configured to assist in generation of an airstream directed from the nanofiber generation device 2 toward the suction box 8 when the suction box 8 starts to operate, and prevent nanofibers generated by the nanofiber generation device 2 from scattering around the apparatus. It is desirable to construct the guide box 7 to be extendable and retractable, for example, as a nested structure. This is intended to allow the guide box 4 to be extended to lengthen distance to the collection device 6, for example, when the liquid polymer is not sufficiently dried, so as to sufficiently dry the liquid polymer (nanofibers). Supposing that the nanofiber production apparatus 2 is devoid of the guide box 4, the high-speed and high-temperature air blown from the air nozzle of this nanofiber production apparatus entrains surrounding air, so that the airstream becomes unstable. As a measure against this problem, the above guide box 4 is used to allow a stable airstream to be generated. This makes it possible to stably produce small-diameter (thin) nanofibers.

It is desirable to form the guide box 4 using a material which is hardly electrostatically charged, such as a wood material, SUS, aluminum or PET. In the first embodiment, the ESD system is not used, and thereby the nanofibers are almost not electrostatically charged. On the other hand, if the guide box 4 is electrostatically charged, the nanofibers are undesirably drawn by the guide box 4, so that the nanofibers are unevenly deposited in the collection device 6. As a measure against this problem, the guide box 4 is formed of a material which is hardly electrostatically charged, to allow the nanofibers to be evenly deposited in the collection device 6.

The suction box 8 is provided on a downstream side of the collection device 6. The suction box 8 is equipped with a fan 8A, and operable to suck air within the guide box 4 to generate airstream directed from the nanofiber generation device 2 toward the collection device 6, inside the guide box 4. The flow straightening member 9 formed in a honeycomb configuration is provided at a suction port of the suction box located on an upstream side of the suction box 8. Thus, when the suction box 8 operates to suck air, the airstream inside the guide box 4 becomes even in any location.

The collection device 6 is disposed on the downstream side of the nanofiber generation device 2 and between the guide box 4 and the flow straightening member 9, and constructed such that it comprises a filter substrate held therein without causing any deflection thereof. The filter substrate has high gas permeability and is therefore free from hindering the suction box 8 from generating an airstream inside the guide box 4. In the case of producing a filter element for a filter such as a medium- or high-performance filter, a HEPA filter or an ULPA filter, it is preferable to use, as the filter substrate, a non-woven or woven fabric comprising glass fibers, synthetic fibers, natural fibers or the like and having a fiber diameter of 0.3 to 50 µm and a thickness of 0.1 to 1.1 mm. On the other hand, in the case of producing a filter element for a bag filter, it is preferable to use, as the filter substrate, a non-woven or woven fabric comprising glass fibers, synthetic fibers, natural fibers or the like and having a fiber diameter of 1.0 to 100 µm and a thickness of 0.1 to 1.0 mm. Further, a bonding medium consisting of a binder, molten fibers or an adhesive powder may be given to one surface of the filter substrate. As a non-woven or woven fabric for use in the filter substrate, it is possible to use: organic fibers, such as polyester fibers, polyamide fibers, polyethylene fibers, rayon fibers or polypropylene fibers; glass fibers: or pulp fibers. These types of fibers may be used independently or in the form of a combination of two or more of them.

Figure 2:
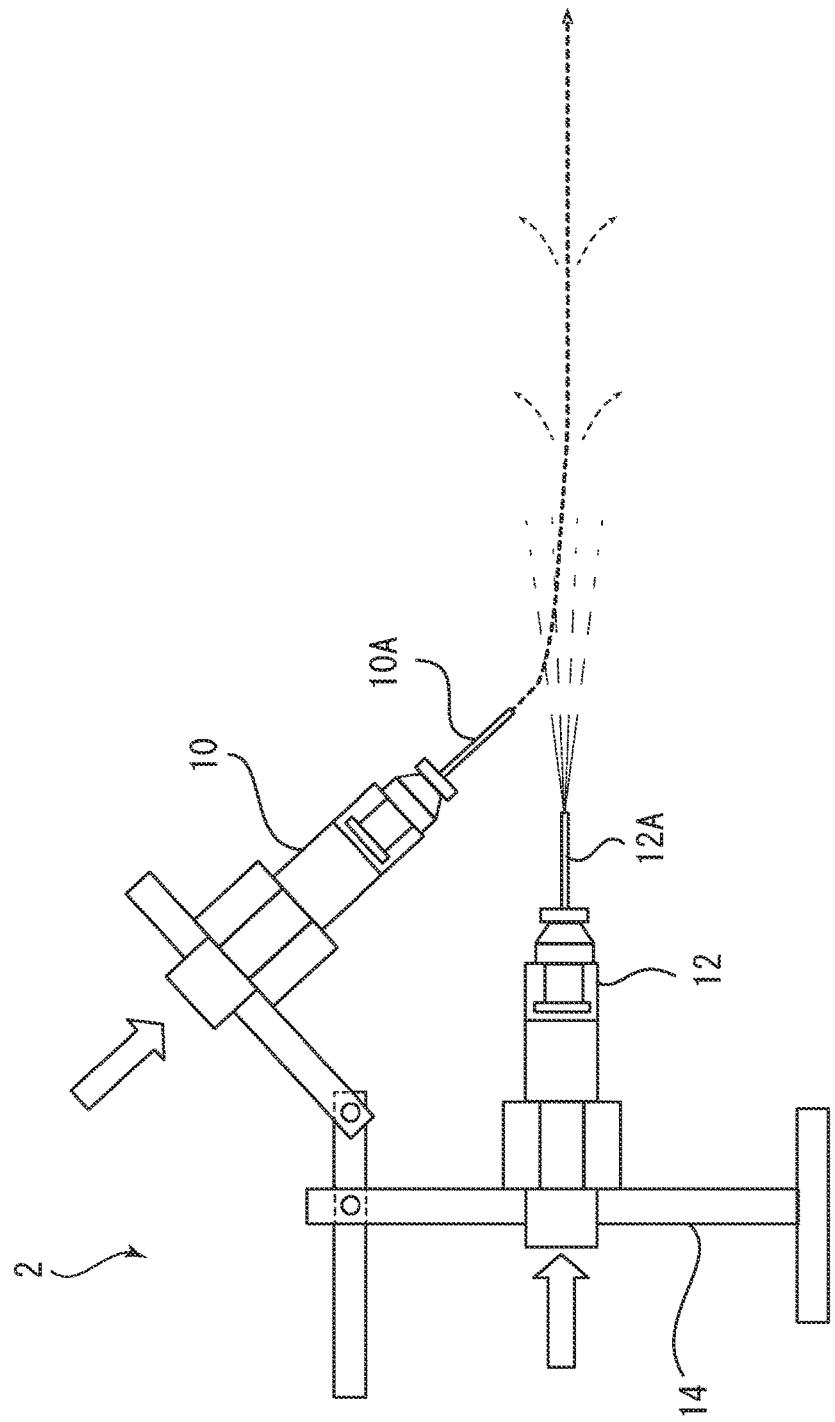
FIG. 2 is a diagram depicting a configuration of a nanofiber generation device of the nanofiber production apparatus according to the first embodiment.

FIG. 2 is a diagram depicting a configuration of the nanofiber generation device 2. As depicted in FIG. 2, the nanofiber generation device 2 comprises: an ejector nozzle 10 configured to eject a dissolved polymer; an air nozzle 12 configured to generate a high-speed and high-temperature airflow (high-speed and high-temperature air) 12A; and a support member 14 supporting the ejector nozzle 10 and the air nozzle 12.

The ejector nozzle 10 is configured to be supplied with a liquid polymer and to eject the liquid polymer 10A toward the high-speed and high-temperature air generated by the air nozzle 12. It should be noted that the ejector nozzle 10 is not necessarily configured to eject the liquid polymer 10A toward the high-speed and high-temperature air but may be configured to eject the liquid polymer 10A toward the vicinity of the high-speed and high-temperature air. The liquid polymer 10A may be prepared, for example, by dissolving a nanofiber raw material in a solvent. The following description will be made based on the case where the liquid polymer 10A is a type prepared by dissolving a nanofiber raw material in a solvent. Alternatively, it is possible to use a liquid polymer prepared by heating and melting a nanofiber raw material.

The air nozzle 12 is configured to be supplied with high-temperature and high-speed air (high-temperature and high-pressure air) and is capable of further heating and compressing the high-temperature and high-speed air and then ejecting resulting high-speed and high-temperature air 12A. In the first embodiment, a speed of the high-speed and high-temperature air 12A immediately after being ejected from the air nozzle 12 is preferably set to 200 to 350 m/s. Further, a temperature of the high-speed and high-temperature air 12A is preferably set to 250 to 350° C.

The support member 14 is a device for holding the ejector nozzle 10 and the air nozzle 12 so as to be capable of adjusting a positional relationship therebetween. In the first embodiment, the ejector nozzle 10 is desirably disposed to be spaced apart from the high-speed and high-temperature air 12A ejected from the air nozzle 12, by a given distance. This is because, if the high-speed and high-temperature air 12A having a high pressure is directed to directly hit against the liquid polymer 10A, it can break the liquid polymer 10A into particles, precluding production of nanofibers.

The fiber diameter of the nanofibers can be adjusted by changing a concentration of the solvent of the liquid polymer 10A, the speed of the high-speed and high-temperature air 12A, a viscosity of the liquid polymer 10A, and the temperature of the high-speed and high-temperature air 12A.

Examples of a polymer usable as a raw material of nanofibers, in the apparatus according to the first embodiment, include polyester, polyamide, polyolefin, and polyurethane (PU). More specifically, examples of the polyester include polyethylene terephthalate (PET), polytrimethylene terephthalate (PTT), polybutylene terephthalate (PBT), and polylactate (PLA). Examples of the polyamide include nylon 6 (N6), nylon 66 (N66), and nylon 11 (N11). Examples of the polyolefin include polyethylene (PE), polypropylene (PP) and polystyrene (PS).

Examples of a solvent usable for preparing the liquid polymer include, but are not particularly limited to, methanol, ethanol, 1-propanol, 2-propanol, hexafluoroisopropanol, tetraethyleneglycol, triethylene glycol, dibenzyl alcohol, 1,3-dioxolan, 1,3-dioxane, methyl ethyl ketone, methyl isobutyl ketone, methyl-n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, dimethyl, diethyl phthalate, dipropyl phthalate, methyl chloride, ethyl chloride, methylene chloride, chloroform, methyl bromide, ethyl bromide, propyl bromide, acetic acid, benzene, toluene, hexane, and cyclohexane.

Figure 3:
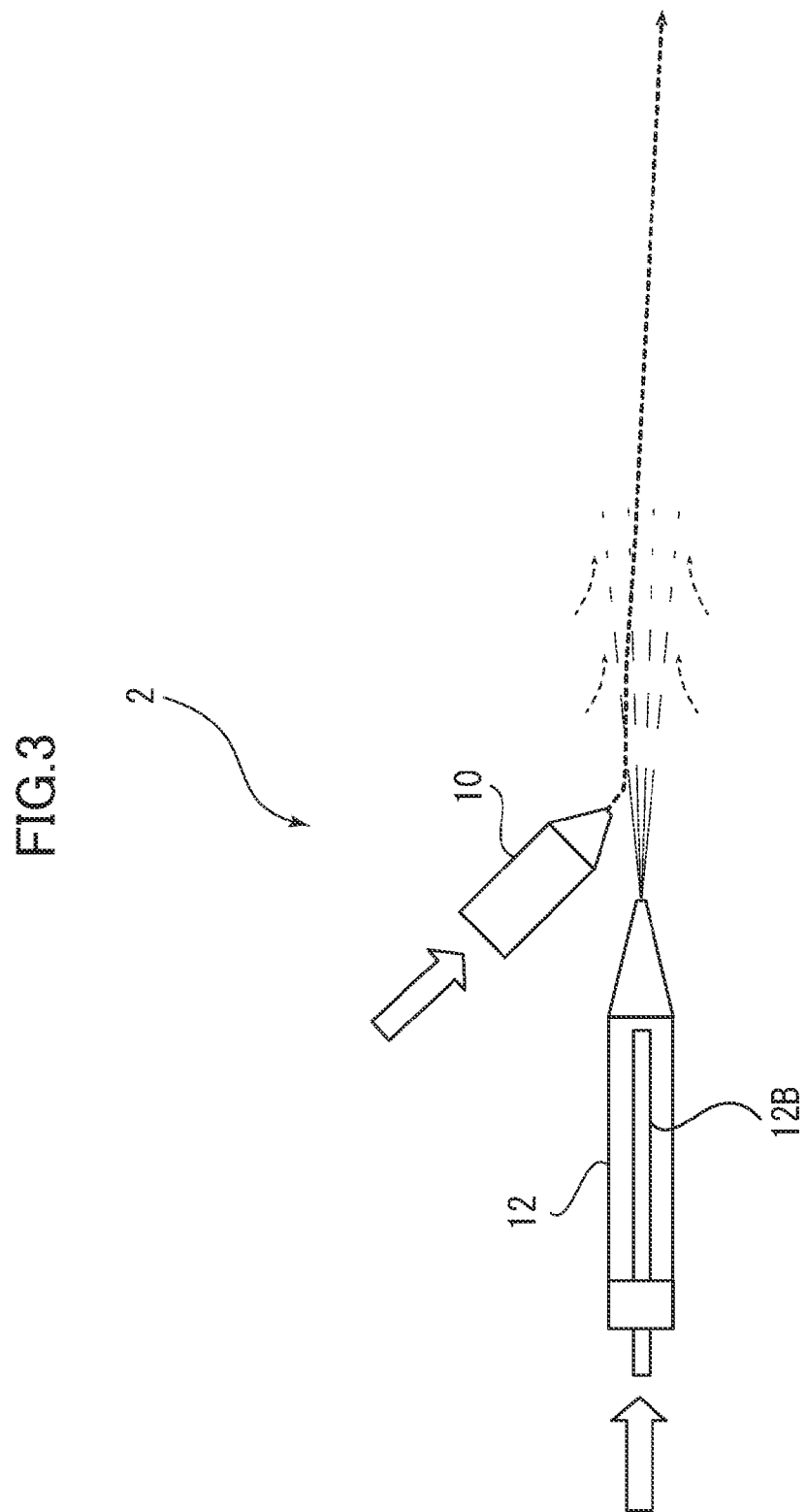
FIG. 3 is a schematic explanatory diagram of an operation of the nanofiber generation device.

FIG. 3 is a schematic explanatory diagram of an operation of the nanofiber generation device 2. In FIG. 3, the ejection nozzle 10 and the air nozzle 12 are schematically depicted. As depicted in FIG. 3, the air nozzle 12 is supplied with high-temperature air and high-speed air, and then, after heating the supplied high-temperature air and high-speed air by a heater 12B provided inside the air nozzle 12, ejects the heated high-temperature air and high-speed air. The heating by the heater 12B makes it possible to expand a volume of the high-temperature air and high-speed air to further accelerate the high-temperature air and high-speed air.

The ejection nozzle 10 ejects the liquid polymer toward the high-speed and high-temperature air ejected from the air nozzle. The liquid polymer ejected from the ejector nozzle 10 is put on the high-speed and high-temperature air, and thereby stretched toward a flow direction of the high-speed and high-temperature air to produce nanofibers.

In this process, if the liquid polymer is directed to directly hit against the high-speed and high-temperature air, it is broken into particles due to a large pressure difference therebetween. As a measure against this problem, in the first embodiment, the high-speed and high-temperature air is blown out at a speed of 200 to 350 m/s immediately after being ejected from the air nozzle 12, so that the high-speed and high-temperature air ejected from the air nozzle 12 entrains surrounding air to thereby form a moderate or gentle airstream having an atmospheric pressure less than that of the high-speed and high-temperature air, around the high-speed and high-temperature air.

The liquid polymer ejected from the ejection nozzle 10 is sucked into the gentle airstream and gradually stretched without being broken into particles. Then, the polymer stretched by the gentle airstream is sucked into the high-speed and high-temperature air and further stretched inside the high-speed and high-temperature air. While the liquid polymer prepared by dissolving a polymer in a solvent is stretched by the gentle airstream and the high-speed and high-temperature air, in the above manner, the solvent is gradually vaporized. When the solvent is fully vaporized, the polymer stops stretching.

In this process, if an ejection amount of the liquid polymer from the ejector nozzle 10 is increased so as to improve efficiency of production of nanofibers, the solvent is likely to fail to be sufficiently vaporized before reaching the collection device, resulting in occurrence of liquid droplets. As a measure against this problem, the high-speed and high-temperature air used in the first embodiment is set to have a speed of 200 to 350 m's and a temperature of 250 to 350° C. Thus, it becomes possible to allow the solvent to be vaporized at a high speed to thereby prevent the occurrence of liquid droplets, enabling mass production of nanofibers. Particularly in the case where a thermoplastic resin is used as a polymer for the liquid polymer, a viscosity of the liquid polymer can be lowered by heating the liquid polymer, so as to form nanofibers having a further reduced fiber diameter.

According to air suction by the suction box 8, the nanofibers produced in this manner are deposited on the filter substrate of the collection device 6 through the guide box 4. The nanofiber generation device 2 is operated until nanofibers are deposited on the filter substrate by a desired thickness. Then, the nanofiber generation device 2 is stopped, and a nanofiber material deposited on the filter substrate is collected.

A filter element using nanofibers produced by the production apparatus according to the first embodiment can obtain the following advantageous effects.

Whereas the ESD system requires the use of high voltage, the production apparatus according to the first embodiment is capable of eliminating the need to use high voltage, and is free from influence of temperature and humidity at a production site. The production apparatus according to the first embodiment also can prepare a three-dimensional structured nanofiber material having a fiber diameter of 200 nm or less, which has heretofore been unachievable. In addition, the production apparatus according to the first embodiment can suppress the occurrence of liquid droplets, which has been regarded as one problem in the ESD system. Further, the production apparatus according to the first embodiment can prevent the occurrence of electric field interference, and can forcibly vaporize the solvent to thereby drastically increase a production amount.

The production apparatus according to the first embodiment uses only high-speed and high-temperature air without using high voltage, so that it becomes free from occurrence of electric charge interference. This makes it possible to easily perform mass production using a plurality of nozzles, and eliminate a need to remove static electricity of a device adjacent to a space for production of nanofibers. In addition, there is no risk of explosion due to the high voltage. This provides high safety.

The production apparatus according to the first embodiment can produce nanofibers having a three-dimensional structure. Thus, in the case where the nanofiber material produced by the production apparatus according to the first embodiment is used for a filter element, it is possible to obtain an advantageous effect of being able to exhibit low pressure loss, high collection efficiency, and larger contamination collection amount. This filter element is also capable of being subject to backwashing to readily remove large dust.

The production apparatus according to the first embodiment can be structurally simplified, as compared to a production apparatus based on the ESD system, so that it becomes possible to provide a maintenance-free and low-cost production apparatus. Particularly in the case of producing nanofibers using a thermoplastic resin, it becomes possible to lower the viscosity of the liquid polymer by the high-speed and high-temperature air so as to achieve a smaller fiber diameter, and reduce a concentration of the solvent necessary for obtaining the same fiber diameter, by heating the liquid polymer.

Figure 4:
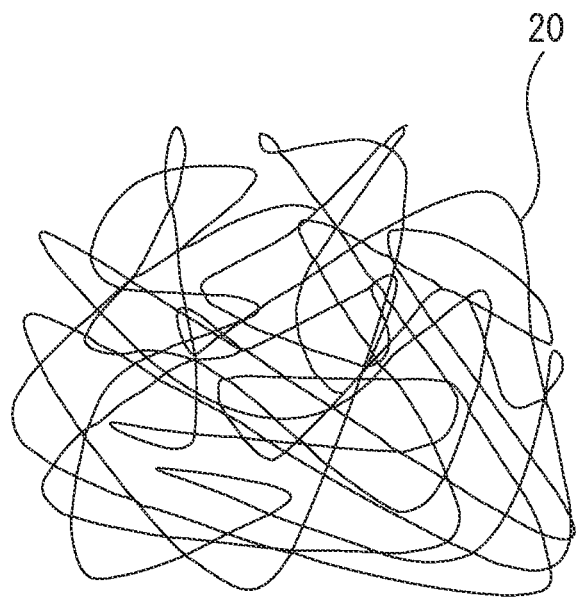
FIG. 4 is a schematic diagram depicting a configuration of a nanofiber material obtained by the nanofiber production apparatus according to the first embodiment.
Figure 14:
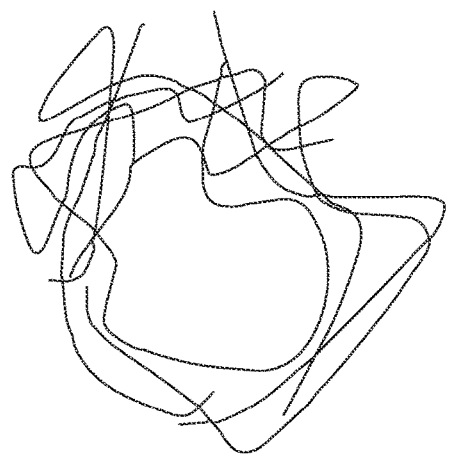
FIG. 14 is a first schematic diagram depicting a configuration of a nanofiber material produced by the ESD system.
Figure 15:
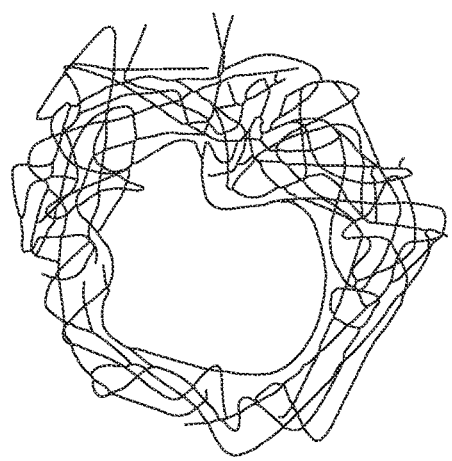
FIG. 15 is a second schematic diagram depicting a configuration of the nanofiber material produced by the ESD system.

FIG. 4 is a schematic diagram depicting a configuration of a nanofiber material obtained by the production apparatus according to the first embodiment. As depicted in FIGS. 14 and 15, a large hole is undesirable formed in the nanofiber material produced by the ESD system, as mentioned above. In contrast, the production apparatus according to the first embodiment can provide a nanofiber material 20 free of such a hole. The production apparatus according to the first embodiment also can form a filter element using nanofibers having a smaller fiber diameter than ever before. More specifically, nanofibers obtained by the production apparatus according to the first embodiment may be used in an ion-exchange resin. In this case, it becomes possible to prepare a filter element capable of completely removing virus and harmful substances in the water. It also becomes possible to remove odor components. Thus, the nanofibers can be used to remove smell of cigarette.

A nanofiber material composed of nanofibers produced by the ESD system to have a fiber diameter of about 100 nm is formed in a planar film-like shape. In contrast, the nanofiber material formed by the production apparatus according to the first embodiment is formed in a bulky layered configuration. This bulky layered configuration provides an advantage effect of being able to exhibit low pressure loss, high dust collection efficiency, and large dust collection amount.

Heretofore, in order to improve the dust collection efficiency based on a filter element using no nanofiber, an amount of fibers has been increased. The increase in amount of fibers leads to an increase in pressure loss. Thus, it is conceivable to use nanofibers to reduce the pressure loss by a slip flow effect. However, in the case of using nanofibers produced by the ESD system, as the fiber diameter of the nanofibers becomes smaller, a resulting nanofiber material becomes thinner. This is because, during production of nanofibers based on the ESD system, the nanofibers having strong electric charges are pulled toward the substrate by strong Coulomb force. This results in poor collection efficiency and increased pressure loss in a filter element using the nanofibers produced by the ESD system.

Differently from the ESD system, in the production apparatus according to the first embodiment, nanofibers are formed in a layered configuration because they softly land on the substrate (filter substrate). When the fiber diameter of nanofibers is reduced to 400 nm or less, an intermolecular force becomes stronger. By this factor and others factor, dust is adsorbed onto the nanofibers by the intermolecular force, instead of being captured in inter-fiber spaces of the filter element. Thus, the nanofiber material produced by the production apparatus according to the first embodiment can exhibit high collection efficiency, low pressure loss and larger dust collection amount.

Further, the production apparatus according to the first embodiment can form a bulky filter element, even using nanofibers having a fiber diameter of less than 400 nm. This makes it possible to collect smaller dust.

Second Embodiment

Figure 5:
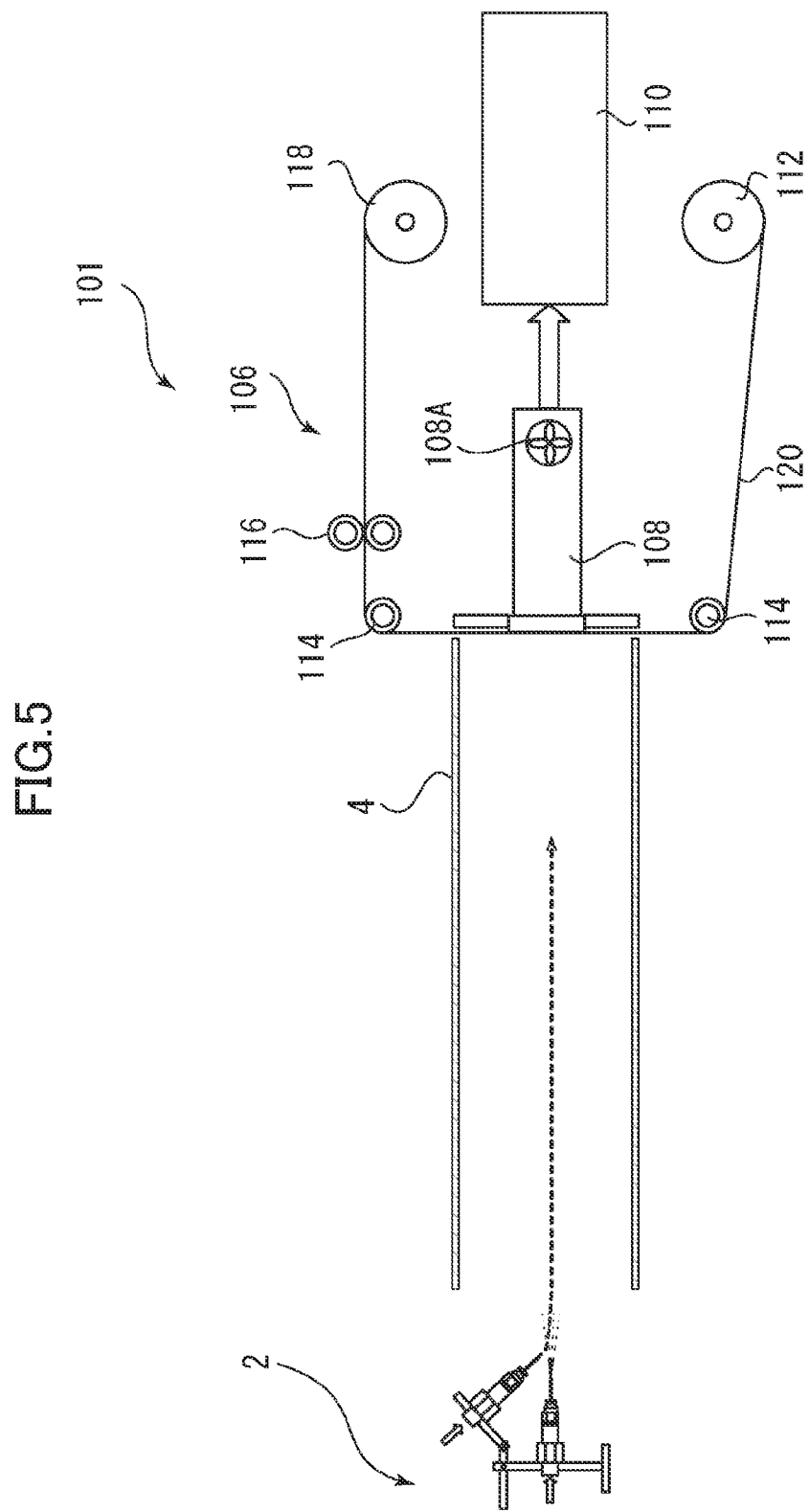
FIG. 5 is a schematic diagram depicting a configuration of a nanofiber production apparatus according to a second embodiment of the present invention.

A nanofiber production apparatus according to a second embodiment of the present invention will be described below. In the following description, the same element or component as that in the first embodiment is assigned with the same reference sign, and its description will be omitted. FIG. 5 is a schematic diagram depicting a configuration of the nanofiber production apparatus 101 according to a second embodiment of the present invention. As depicted in FIG. 5, the nanofiber production apparatus 101 comprises: a nanofiber generation device 2: a collection device 106 provided on a downstream side of the nanofiber generation device 2; a suction box 108 provided on a downstream side of the collection device 106; a guide box 4 provided on the downstream side of the nanofiber generation device 2 and on an upstream side of the collection device 106; and a filter device 110.

The nanofiber generation device 2 and the guide box 4 have the same configurations as those in the first embodiment. As a liquid polymer, it is possible to use one type prepared by dissolving a nanofiber raw material in a solvent, as with the first embodiment, or another type prepared by heating and melting a nanofiber raw material, as with an aftermentioned third embodiment.

The suction box 108 is equipped with a fan 108A, and provided on the downstream side of the collection device 106. The suction box 108 is configured to generate an airstream directed from the nanofiber generation device toward the suction box 108 and suck nanofibers formed by the nanofiber generation device. The suction box 108 in the second embodiment is constructed such that only a part thereof is opened only in a central region of a cross-section of the guide box 4 to perform the suction, and the remaining region is not opened with respect to the guide box.

The filter device 110 is composed of a scrubber or a chemical filter, and operable to clean gas containing an organic solvent generated during formation of nanofibers by the nanofiber generation device 2, and discharge the cleaned gas.

The collection device 106 is provided on a downstream side of the guide box 4, and comprises a filter substrate supply roll 112, a pair of unrolling reels 114, a thermal compression roller 116 and a take-up roll 118.

The filter substrate supply roll 112 is composed of a cylindrical-shaped member, wherein a filter substrate 120 is wound around an outer periphery of the cylindrical-shaped member.

The pair of unrolling reels 114 are provided above and below a downstream opening of the guide box 4, respectively, and arranged to allow the filter substrate 120 to pass through the vicinity of the downstream opening of the guide box 4.

The thermal compression roller 116 is composed of a pair of rollers each incorporating a heater, and operable to heat the filter substrate 120 while nipping it therebetween. An adhesive having a low melting point is preliminarily attached to the filter substrate 120. Thus, when the filter substrate 120 having nanofibers deposited on a surface thereof passes through between the pair of rollers, the nanofibers are fixed to the filter substrate 120 by the adhesive.

The take-up roll 118 is composed of a cylindrical-shaped member, and operable to take up the filter substrate 120 according to driving of a motor.

Production of a nanofiber filter element will be described below.

First of all, the motor for the filter substrate take-up roll 118 is activated and driven. Thus, the filter substrate 120 wound around the filter substrate supply roll 112 is moved between the pair of unrolling reels 114. Then, the suction box 108 is operated to generate, inside the guide box 4, an airstream directed toward the suction box 108 through the filter substrate 120. Then, dissolved polymer is ejected from an ejector nozzle 10 of the nanofiber generation device 2, and high-speed and high-temperature air is generated from an air nozzle 12 of the nanofiber generation device 2. Thus, the dissolved polymer is stretched to form nanofibers in the same manner as described in the first embodiment, and the stretched nanofibers are deposited on the filter substrate 120. Then, the filter substrate 120 having the nanofibers deposited thereon is subjected to heating treatment through the thermal compression roller 116, so that the nanofibers are integrally laminated to the filter substrate 120, and taken up by the take-up roll 118 in the form of a nanofiber filter element. Gas containing an organic solvent generated during production of the nanofibers is cleaned by the filter device 110.

The filter element formed by laminating, to the filter substrate, the nanofibers produced by the production apparatus according to the second embodiment will be described in detail below.

The nanofibers produced by the production apparatus according to the second embodiment are not strongly electrostatically charged, as compared to the ESD system, and thereby the collection of nanofibers is performed based on air suction by the suction box 108. In this process, when nanofibers adhere on a partial region of the filter substrate, a pressure loss in the region is increased. However, even when nanofibers adhering on a partial region of the filter substrate causes an increase in pressure loss of the region, sucked air flows into the remaining region having a less amount of adhered nanofibers. Thus, adhesion of nanofibers becomes even. Further, in the second embodiment, the guide box 4 is provided, so that nanofibers generated from the nanofiber generation device 2 is reliably guided toward the filter substrate 120 and efficiently deposited on the filter substrate 120.

Properties of a nanofiber filter element produced by the production apparatus according to the second embodiment will be described below.

Figure 16:
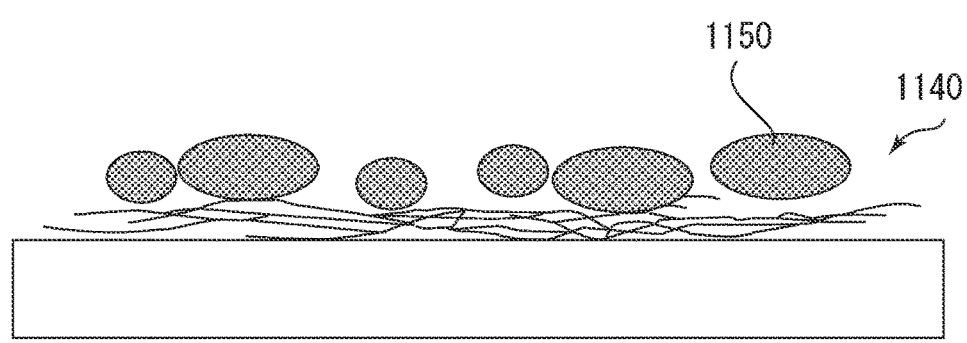
FIG. 16 is a schematic diagram depicting a nanofiber material produced by the ESD system.

In the ESD system, nanofibers are electrostatically charged because they are prepared by utilizing a repulsion force of electric charges. Thus, as described in connection with the background art, when a nanofiber material is produced based on the ESD system using nanofibers having a fiber diameter of 300 nm or less, only the filter element 1140 composed of the flat plate-shaped, single layer structured nanofiber material as depicted in FIG. 16 can be formed.

Figure 6:
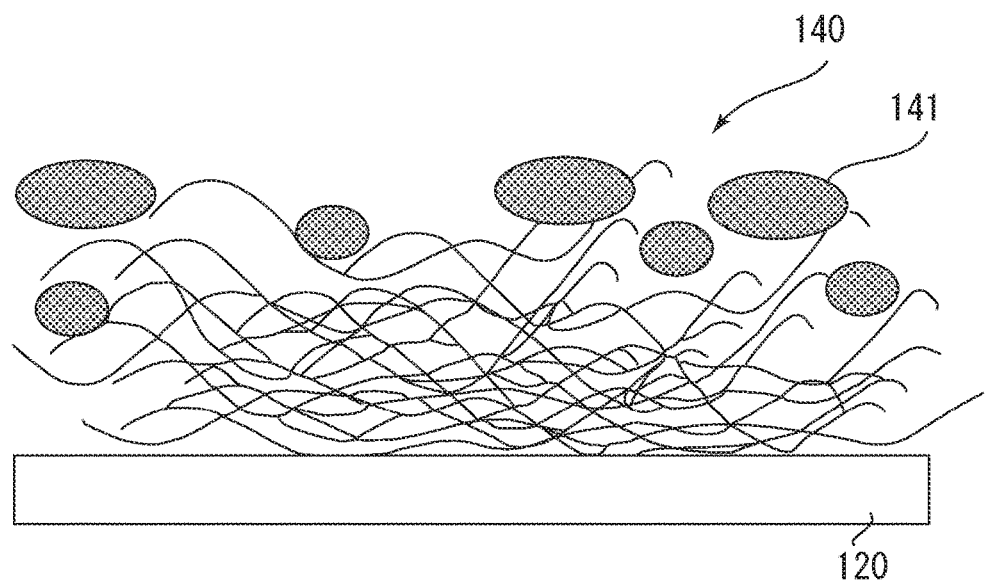
FIG. 6 is a schematic diagram depicting a nanofiber material produced by the nanofiber production apparatus according to the second embodiment.

Differently from the ESD system, in the production apparatus according to the second embodiment, resulting nanofibers are not electrostatically charged. Thus, as depicted in FIG. 6, during the collection, nanofibers 141 are laminated while maintaining a three-dimensional structure, without sticking to the filter substrate 120. As a result, the production apparatus according to the second embodiment can create a nanofiber filter element 140 capable of exhibiting high collection efficiency, low pressure loss and large duct collection amount.

In the conventional filter element 1140, dust is collected in inter-fiber spaces. Thus, clogging inevitably occurs, and the collected dust is hardly removed even if a pressure is applied reversely. In contrast, the nanofiber filter element 140 produced by the production apparatus according to the second embodiment is constructed such that dust adheres on a surface of the filter element 140 without entering inter-fiber spaces because an inter-fiber spacing thereof is extremely small. Thus, the duct can be readily removed by giving a pressure reversely. For example, a dual-filter structure may be employed. In this case, one of two filter line is switchably operated and a reverse pressure is applied in the other filter line, which makes it possible to prevent the occurrence of clogging so as to maintain high collection efficiency for a long period of time.

As the filter substrate for the nanofiber filter element, it is possible to use a nonwoven or woven fabric. As the nonwoven or woven fabric, it is possible to use: organic fibers, such as polyester fibers, polyamide fibers, polyethylene fibers, rayon fibers or polypropylene fibers; glass fibers; or pulp fibers. These types of fibers may be used independently or in the form of a combination of two or more of them. As a technique of forming such a non-woven or woven fabric, it is possible to use a wet paper making process, a dry paper making process, a spunbonding process, or a melt-blown process.

As a bonding medium for the nanofiber filter element, it is possible to use a binder, molten fibers, or an adhesive powder. As the binder, it is possible to use an organic-based binder, an inorganic-based binder, or a mixed binder obtained by mixing them. Preferably, an acrylic resin is used. As molten fibers, it is possible to use core-clad fibers. As the adhesive powder, it is possible to use a powder of resin having a low softening point.

A medium- or high-performance filter, a HEPA filter and an ULPA filter using a nanofiber filter element produced by the production apparatus according to the second embodiment will be described below. These filters are produced by: folding a nanofiber filter element in a zigzag manner to pleat the nanofiber filter element; inserting a bead-shaped adhesive or a separator between respective pleats of the folded and pleated nanofiber filter element; and gas-tightly attaching the resulting nanofiber filter element inside an outer frame by an adhesive. A filter substrate is preferably composed of a non-woven or woven fabric comprising glass fibers, synthetic fibers, natural fibers or the like and having a fiber diameter of 0.3 to 50 μm and a thickness of 0.1 to 1.1 mm.

Figure 7:
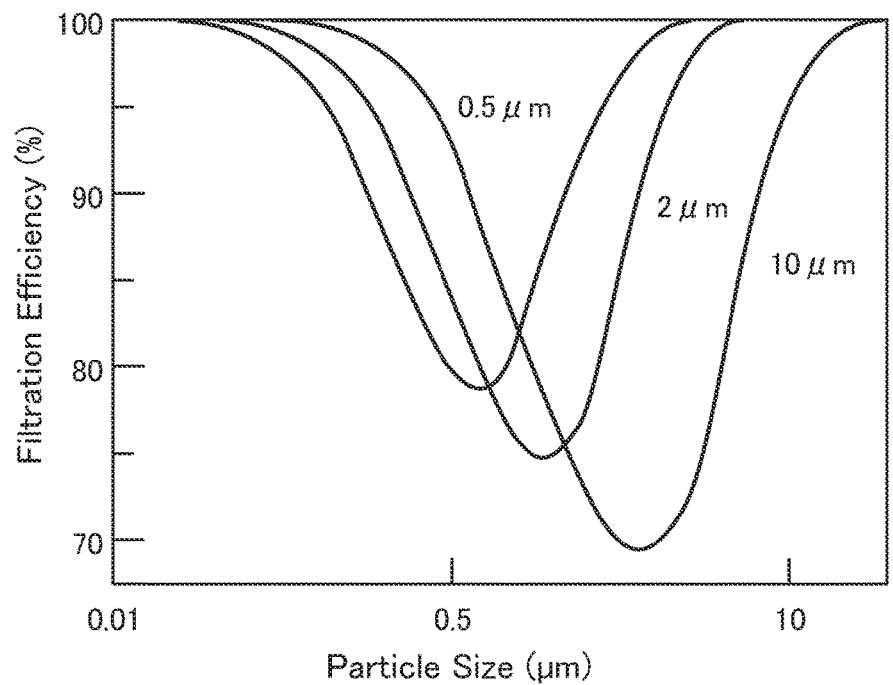
FIG. 7 is a graph depicting a collection efficiency of an ULPA filter using a nanofiber filter element produced by the nanofiber production apparatus according to the second embodiment.

FIG. 7 depicts a collection efficiency of an ULPA filter using a nanofiber filter material produced by the nanofiber production apparatus according to the second embodiment.

Figure 8:
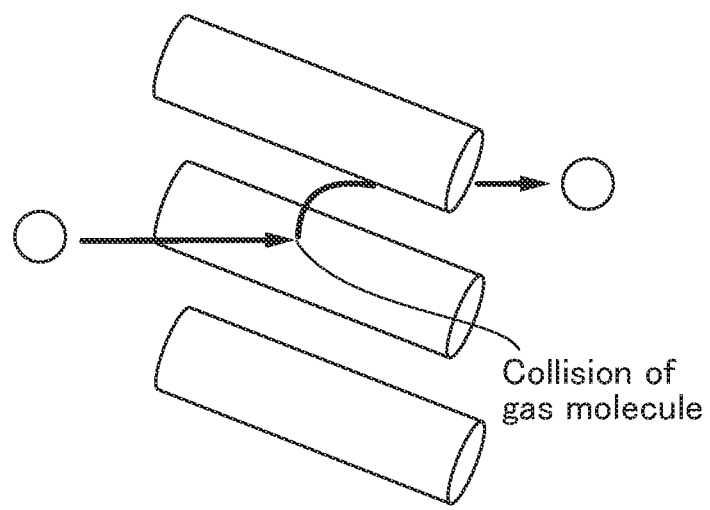
FIG. 8 is a diagram depicting a state in which a gas molecule collides in a conventional filter element.
Figure 9:
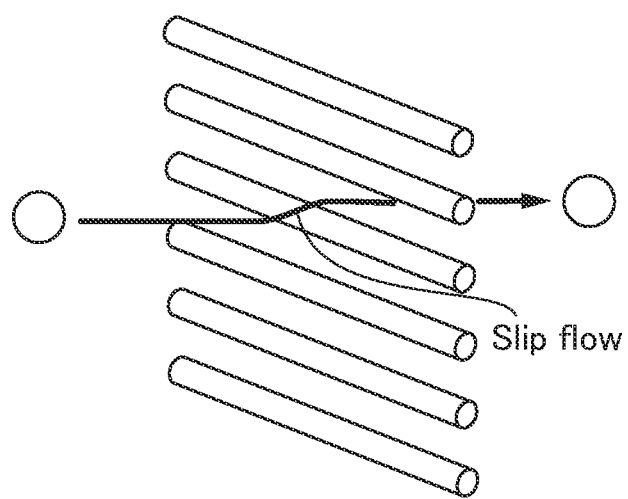
FIG. 9 is a diagram depicting a slip flow of a gas molecule with respect to a nanofiber filter element produced by the nanofiber production apparatus according to the second embodiment.

A bag filter using a nanofiber filter material produced by the nanofiber production apparatus according to the second embodiment will be described below. The bag filter in the second embodiment is produced by forming the nanofiber filter material in a tubular shape. Alternatively, it is produced by folding the nanofiber filter material in a zigzag manner to pleat the nanofiber filter element, and then forming the pleated nanofiber filter element in a circular or envelope shape. A filter substrate is preferably composed of a non-woven or woven fabric comprising glass fibers, synthetic fibers, natural fibers or the like and having a fiber diameter of 1.0 to 100 μm and a thickness of 0.1 to 1.0 mm. Then, preferably, a bonding medium consisting of a binder, molten fibers or an adhesive powder is attached to one surface of the filter substrate, and nanofibers produced in the above manner are integrally laminated thereonto. FIG. 8 is a diagram depicting a state in which a gas molecule collides with a conventional filter material, and FIG. 9 is a diagram depicting a slip flow of a gas molecule with respect to a nanofiber filter element according to the second embodiment. As depicted in FIGS. 8 and 9, the nanofiber filter element according to the second embodiment provides an improved fluid flow by a slip flow effect and exhibits a pressure loss lowering function.

In the industry segment handling filters such as a medium- or high-performance filter, a HEPA filter, an ULPA filter and a bag filter, a filter element capable of exhibiting low pressure loss, high collection efficiency and long usable life has heretofore expected. However, these capabilities conflict with each other, and thereby an ideal filter element has never emerged. However, in the filter industry, great interest is shown in development of a filter element having ideal performance, in connection with emergence of nanofibers as a result of recent technical development in the textile industry. The nanofiber filter element produced by the production apparatus according to the second embodiment can solve the above problems and can exhibit performance such as low pressure loss, high efficiency and long usable life.

Third Embodiment

With reference to the drawings, a nanofiber production apparatus according to a third embodiment of the present invention will be described in detail below.

The third embodiment of the present invention relates to a nanofiber production method based on a system configured to heat high-speed air to a high temperature to cause volume expansion therein to thereby form high-speed and high-temperature air, and stretch a liquid polymer thermally melted by of the high-speed and high-temperature air to thereby produce nanofibers (the inventors call this system a heating-melting type Zetta Spinning system).

The third embodiment of the present invention also relates to a nanofiber production method based on a system which comprises: a mechanism for melting a thermoplastic polymer by heating; an ejector nozzle configured to eject a molten liquid thermoplastic polymer; and an air nozzle configured to generate high-speed and high-temperature air for use in stretching the molten polymer ejected from the ejector nozzle.

The third embodiment of the present invention further relate to a filter element for a filter such as a medium- or high-performance filter, a HEPA filter or an ULPA filter, formed by integrally laminating the nanofibers produced by the above method, to one surface of a filter substrate of a non-woven or woven fabric comprising glass fibers, synthetic fibers, natural fibers or the like and having a fiber diameter of 0.3 to 50 μm and a thickness of 0.1 to 1.1 mm.

The third embodiment of the present invention further relate to a filter element for a bag filter, formed by attaching a bonding medium consisting of a binder, molten fibers or an adhesive powder, onto one surface of a filter substrate of a non-woven or woven fabric comprising glass fibers, synthetic fibers, natural fibers or the like and having a fiber diameter of 1.0 to 100 μm and a thickness of 0.1 to 1.0 mm, and integrally laminating the nanofibers produced by the above method, to the one surface of the filter substrate through the bonding medium.

In the third embodiment, the mechanism for melting a thermoplastic polymer comprises a cylinder wound by a hand heater and a mechanism configured to be reciprocatingly moved inside the cylinder to push out the polymer, wherein it is configured to melt, by the hand hearer, the thermoplastic polymer supplied into the cylinder, and then push out the molten polymer toward the ejector nozzle according to the reciprocating movement of the polymer push-out mechanism. As the polymer push-out mechanism, it is possible to use a feeding system using a screw, a piston or air.

It is desirable to adjustably set a positional relationship between the ejector nozzle configured to eject the molten polymer and the air nozzle configured to generate high-speed and high-temperature air for use in stretching the molten polymer ejected from the ejector nozzle. As the ejector nozzle, it is possible to use a commercially-available needle capable of changing a nozzle diameter. As the air nozzle, it is also possible to use a commercially-available needle.

What is an important matter in the third embodiment is that a tip of the ejector nozzle for ejecting a molten polymer is disposed to be spaced apart from the high-speed and high-temperature air by an appropriate distance. This is because, if the high-speed and high-temperature air having a large pressure difference is directed to directly hit against the liquid polymer, it can break the liquid polymer into particles, precluding production of nanofibers. A fiber diameter of nanofibers is determined by a speed of the high-speed and high-temperature air, a viscosity of the liquid polymer, and a temperature of the high-speed and high-temperature air.

As the thermoplastic polymer as a nanofiber raw material for use in the third embodiment, it is possible to use the same type as that in the first and second embodiments. The third embodiment can obtain the same functions/effects as those in the first and second embodiments.

With reference to the drawings, the production apparatus according to the third embodiment, and a filter element using nanofibers produced by this production apparatus will be described in detail below. In the following description, the same element or component as that in the first or second embodiments is assigned with the same reference sign, and its description will be omitted.

Figure 10:
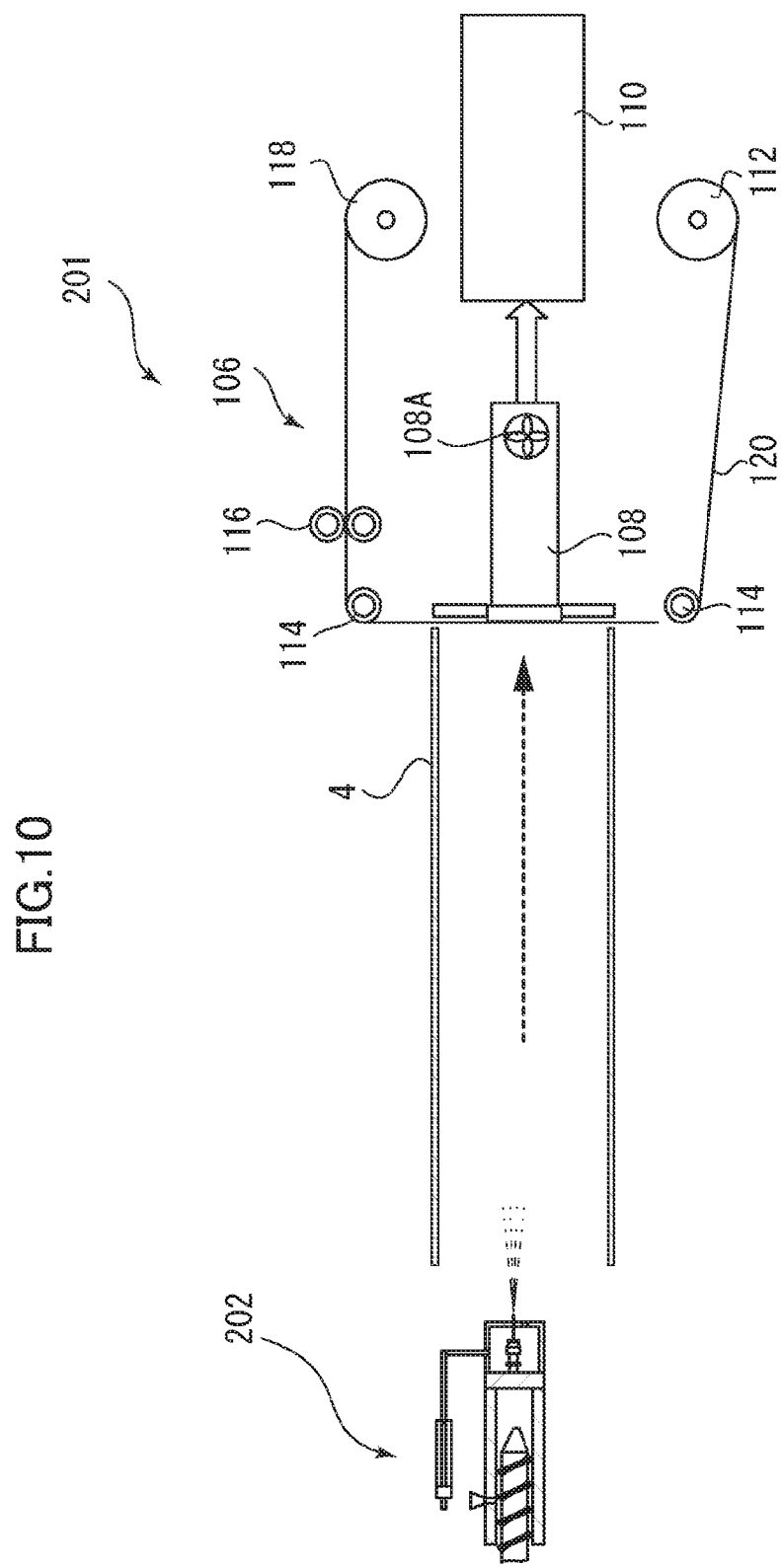
FIG. 10 is a schematic diagram depicting a configuration of a nanofiber production apparatus according to a third embodiment of the present invention.

First of all, the production apparatus according to the third embodiment will be described. FIG. 10 is a schematic diagram depicting a configuration of the nanofiber production apparatus according to the third embodiment. As depicted in FIG. 10, the nanofiber production apparatus 201 comprises: a nanofiber generation device 202: a collection device 106 provided on a downstream side of the nanofiber generation device; a suction box 108 provided on a downstream side of the collection device 106; a guide box 4 provided on the downstream side of the nanofiber generation device 202 and on an upstream side of the collection device; and a filter device 110 provided on a downstream side of the suction box 108. The guide box 4, the collection device 106, the suction box 108 and the filter device 110 have the same configurations as those in the second embodiment.

Figure 11:
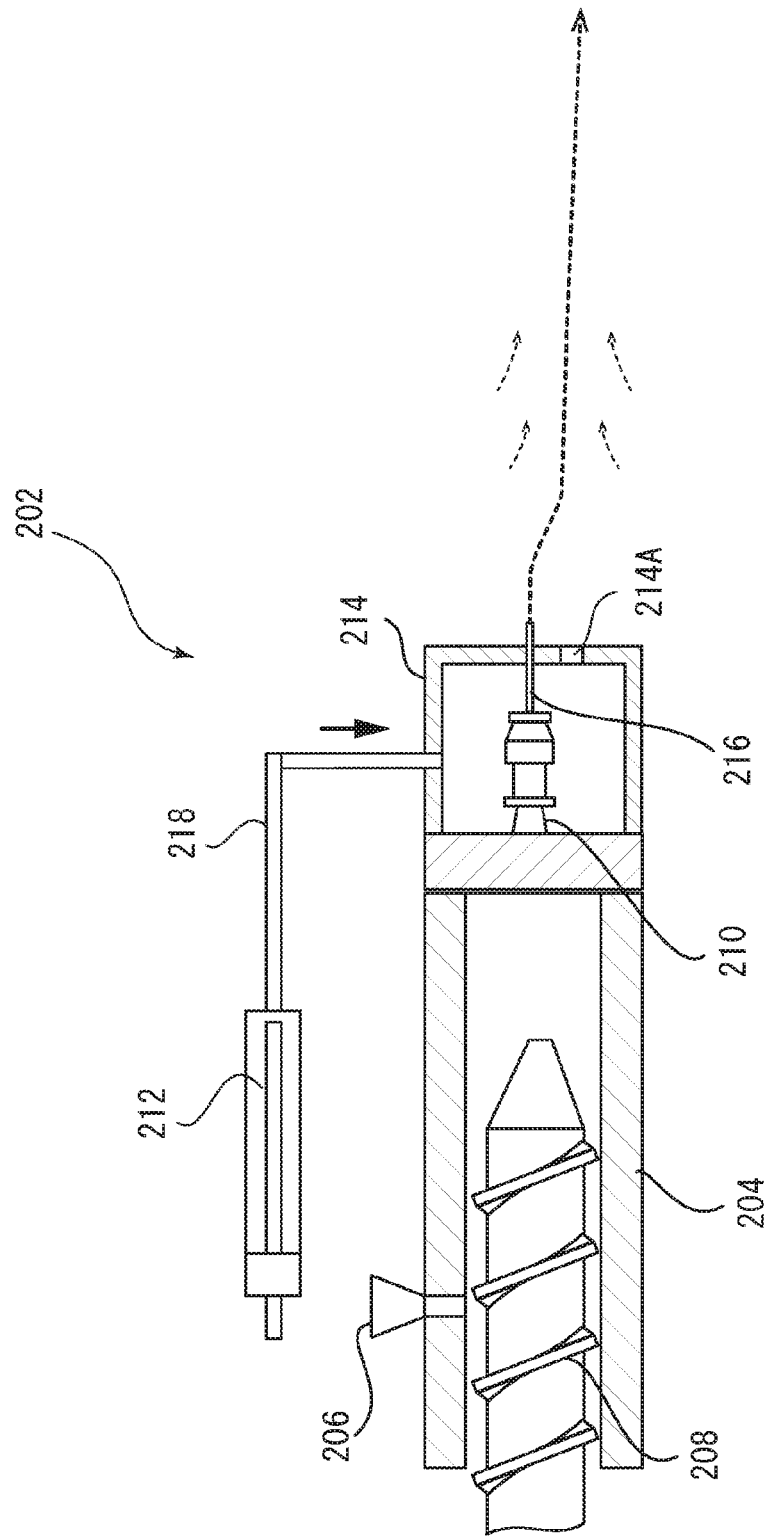
FIG. 11 is a diagram depicting a configuration of a nanofiber generation device of the nanofiber production apparatus according to the third embodiment.

FIG. 11 is a diagram depicting a configuration of the nanofiber generation device 202 of the nanofiber production apparatus 201 according to the third embodiment. As depicted in FIG. 11, the nanofiber generation device 202 in the third embodiment comprises a cylinder 204, a hopper 206, a screw 208 provided inside the cylinder 204, an ejection nozzle 210, an air nozzle 212, and a guide box 214.

A hand heater (not depicted) is wound around the cylinder 204. A thermoplastic polymer supplied from the hopper 206 is heated and melted by the hand heater to form a liquid polymer (molten polymer). The injector nozzle 210 is connected to a distal end of the cylinder 204 to eject the liquid polymer. A nozzle head (needle) 216 is connected to the ejector nozzle 210 to extend outside the guide box 214. In this configuration, the molten polymer is rejected from the nozzle head 216 of the ejector nozzle 210 toward the vicinity of the high-speed and high-temperature air.

The hopper 206 is communicated with an internal space of the cylinder 204, and the thermoplastic polymer is reserved therein.

The screw 208 is configured to be reciprocatingly moved inside the cylinder 204. When the screw 208 is reciprocatingly moved inside the cylinder 204, the molten polymer in the cylinder 204 is pushed out from the nozzle head 216, and accordingly the thermoplastic polymer is supplied from the hopper 206 into the cylinder 204.

The guide box 214 is provided on the distal end of the cylinder 204, and formed with a blowout hole 214A below the nozzle head 216.

The air nozzle 212 is configured to be supplied with high-speed (high-pressure) air. The air nozzle 212A has a heater built therein to heat the supplied high-speed (high-pressure) air. A connection pipe 218 is connected to the air nozzle 212, and a distal end of the connection pipe 218 is connected to the guide box 214. The high-speed air supplied to the air nozzle 212 is heated by the built-in heater and blown out from the blowout hole 214A of the guide box 214 to serve as the high-speed and high-temperature air. In the third embodiment, a speed of the high-speed and high-temperature air just after being ejected from the blowout hole 214A is preferably set to 200 to 350 m/s. Further, a temperature of the high-speed and high-temperature air is preferably set to 250 to 350° C.

A method for generating nanofibers by the nanofiber generation device 202 in the third embodiment will be described below.

In the production apparatus according to the third embodiment, high-speed (high-pressure) air is supplied to the air nozzle 212. The high-speed air supplied to the air nozzle 212 is heated to a high temperature by the built-in heater while causing volume expansion therein, i.e., further increased in speed (pressure). The air increased in temperature and speed in the above manner (high-speed and high-temperature air) is sent into the guide box 214 via the connection pipe 218, and blown out from the blowout hole 214A of the guide box 214.

The thermoplastic polymer in the cylinder 204 supplied from the hopper 206 is melted by the hand heater to form a liquid polymer. Then, when the screw 208 is driven, the liquid polymer in the cylinder 204 is pushed out toward the ejector nozzle 210, and ejected through the nozzle head 216. The liquid polymer ejected from the nozzle head 216 is stretched by a flow of the high-speed and high-temperature air to form nanofibers.

In this process, if the liquid polymer is directed to directly hit against the high-speed and high-temperature air, the liquid polymer is broken into particles due to a large pressure difference therebetween, as mentioned above. As a measure against this problem, in the third embodiment, the high-speed and high-temperature air is ejected from the blowout hole 214A of the guide box 214 in such a manner as to entrain surrounding air to thereby form a moderate or gentle airstream having an atmospheric pressure less than that of the high-speed and high-temperature air, around the high-speed and high-temperature air, as with the first and second embodiments. Then, the liquid polymer ejected from the nozzle head 216 is sucked in the gentle airstream and gradually stretched, and then the polymer stretched by the gentle airstream is sucked into the high-speed and high-temperature air and further stretched inside the high-speed and high-temperature air. In this process, an intermolecular force of the polymer is gradually increased, and, when the intermolecular force is balanced with a stretching force of the high-speed and high-temperature air, the stretching is stopped. In the third embodiment, a material used for the liquid polymer is a thermoplastic resin. Thus, a viscosity of the liquid polymer can be lowered by heating and melting the liquid polymer, so as to form nanofibers having a further reduced fiber diameter.

The production apparatus 201 according to the third embodiment can produce nanofibers in the same manner as that in the second embodiment.

Specifically, a motor for a filter substrate take-up roll 118 is activated and driven. Thus, a filter substrate 120 wound around a filter substrate supply roll 112 is moved between a pair of unrolling reels 114. Then, the suction box 108 is operated to generate, inside the guide box, an airstream directed toward the suction box 108 through the filter substrate. Then, molten polymer is ejected from the ejector nozzle of the nanofiber generation device 202, and high-speed and high-temperature air is generated from the blowout hole 214A. Thus, the molten polymer is stretched to form nanofibers, as described in detail in the second embodiment, and the stretched nanofibers are deposited on the filter substrate 120. Then, the filter substrate 120 having the nanofibers deposited thereon is subjected to heating treatment through a thermal compression roller 116, so that the nanofibers are integrally laminated to the filter substrate 120, and taken up by the take-up roll 118 in the form of a nanofiber filter element. Pollutant gas generated during production of the nanofibers is cleaned by the filter device 110.

The production apparatus according to the third embodiment can obtain the same effects as those in the production apparatus according to the second embodiment. The production apparatus according to the third embodiment can be used to produce a filter element for use in a medium- or high-performance filter, a HEPA filter, an ULPA filter or the like, as with the second embodiment.

In the third embodiment, as the liquid polymer, a liquid polymer prepared by heating and melting a nanofiber raw material is used. Alternatively, a liquid polymer prepared by dissolving a nanofiber raw material in a solvent may be used as with the first embodiment.

Figure 12:
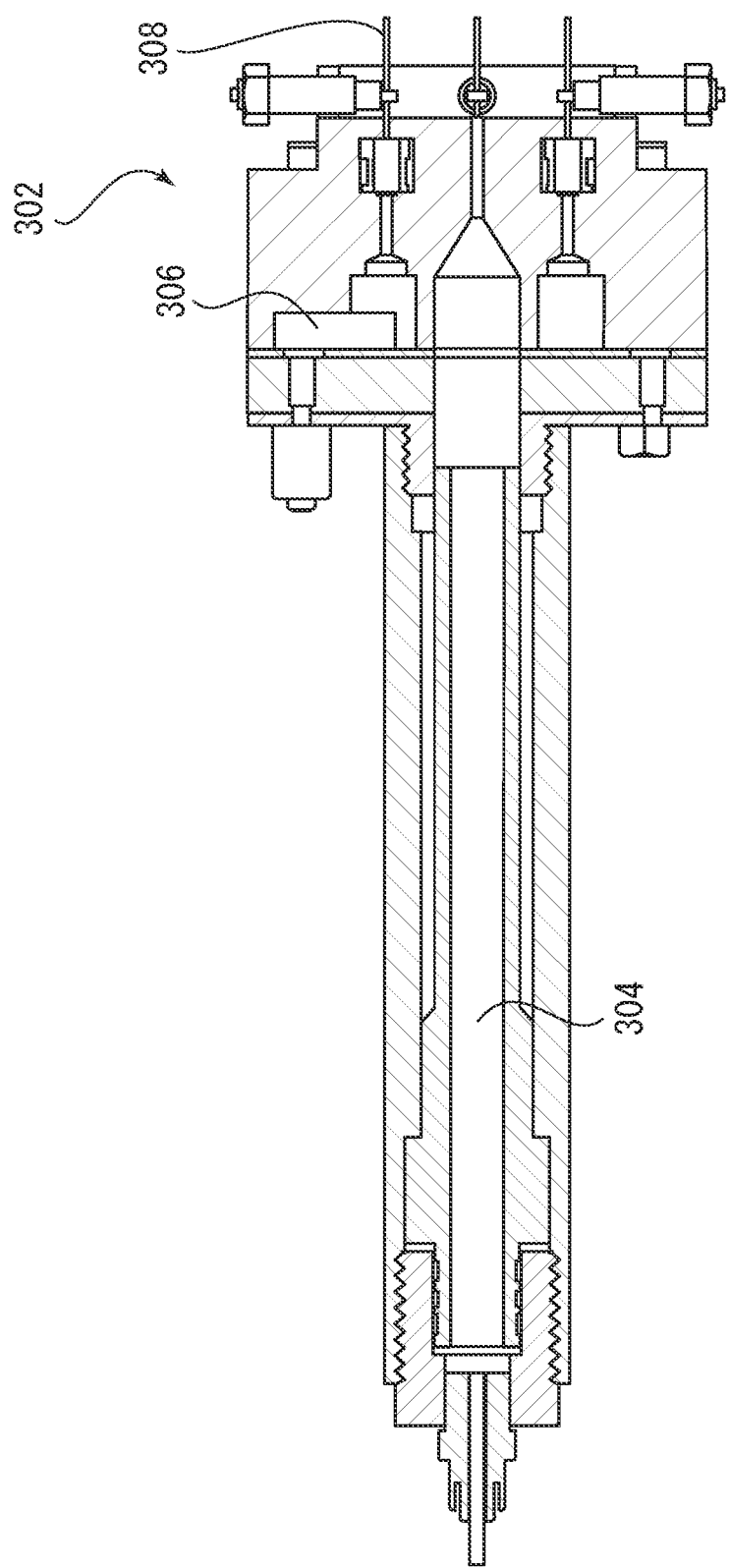
FIG. 12 is a sectional view depicting another configuration of the nanofiber generation device.
Figure 13:
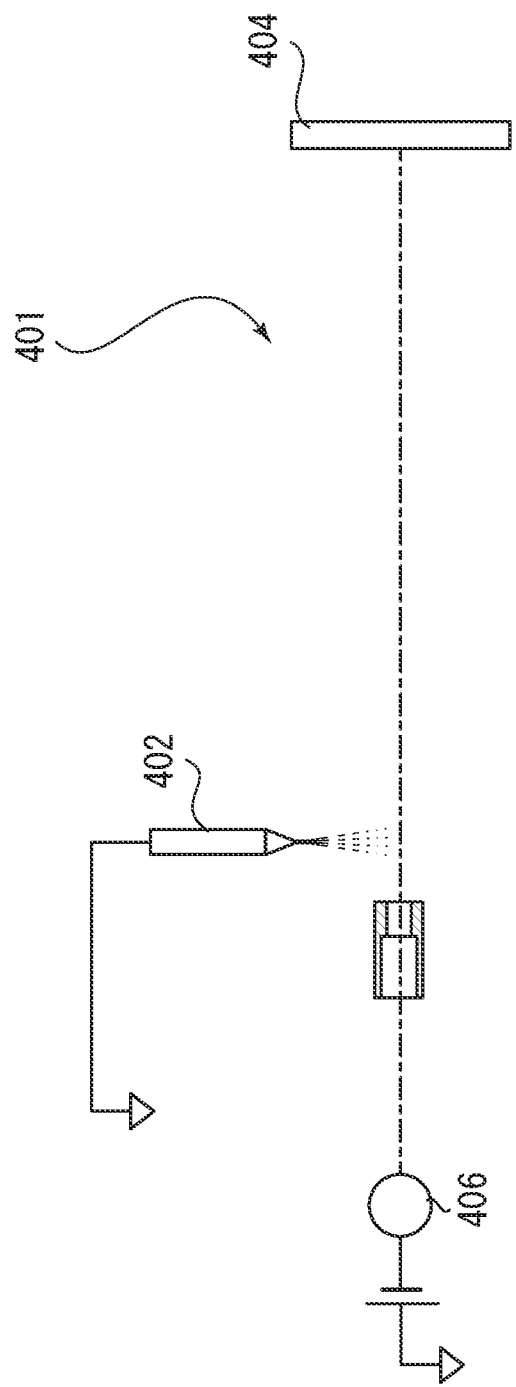
FIG. 13 is a schematic diagram depicting one example of nanofiber production apparatus based on an ESD system.

A nanofiber generation device usable in the present invention is not limited to the types described in the above embodiments. FIG. 12 is a sectional view depicting a configuration of a nanofiber generation device 302 usable in the present invention. As depicted in FIG. 12, the nanofiber generation device 302 comprises a gas passage 304 along a central axis thereof, and a liquid polymer passage 306 provided in an outer periphery thereof. High-speed air (high-pressure air) is supplied to the gas passage 304. A heat generation wire is provided in the gas passage 304, and the supplied high-speed air is heated by the heat generation wire, and compressed. Then, the resulting high-speed and high-temperature air is blown out from an ejection port.

A liquid polymer is supplied to the liquid polymer passage 306, and a needle 308 is connected to a distal end of the liquid polymer passage 306. The liquid polymer to be supplied to the liquid polymer passage 306 may be a liquid polymer prepared by heating and melting a polymer, or a liquid polymer prepared by dissolving a polymer in a solvent. The nanofiber generation device 302 configured as above may be used as a substitute for each of the nanofiber generation devices in the first to third embodiments.

LIST OF REFERENCE SIGNS

1: nanofiber production apparatus
2: nanofiber generation device
4: guide box
6: collection device
8: suction box
8A: fan
9: flow straightening member
10: ejector nozzle
10A: liquid polymer
12: air nozzle
12A: high-speed and high-temperature air
12B: heater
14: support member
20: nanofiber material
101: nanofiber production apparatus
106: collection device
108: suction box
108A: fan
110: filter device
112: filter substrate supply roll
114: unrolling reel
116: thermal compression roller
118: take-up roll
120: filter substrate
140: nanofiber filter element
141: nanofiber
201: nanofiber production apparatus
202: nanofiber generation device
204: cylinder
206: hopper
208: screw shaft
210: ejector nozzle
212: air nozzle
214: guide box
216: nozzle head
218: connection pipe
302: nanofiber generation device
304: gas passage
306: liquid polymer passage
308: needle

The invention claimed is:

1. A nanofiber production apparatus, comprising:
a nanofiber generation device, comprising:
an air nozzle configured to eject high-speed and high-temperature air,
an ejector nozzle configured to eject a liquid polymer, and
a support member for holding the ejector nozzle and the air nozzle so as to be capable of adjusting a positional relationship therebetween,
wherein the ejector nozzle is supported by the support member to be spaced apart from the high-speed and high-temperature air ejected from the air nozzle by a given distance, and the ejector nozzle is provided on a downstream side of the air nozzle in such a manner as to allow the liquid polymer ejected from the ejector nozzle to be sucked into a gentle airstream formed around the high-speed and high-temperature air having an atmospheric pressure less than that of the high-speed and high-temperature air through a phenomenon that the high-speed and high-temperature air ejected from the air nozzle entrains surrounding air, so as to be gradually stretched without being broken into particles, and allow the liquid polymer stretched by the gentle airstream to be sucked into the high-speed and high-temperature air and further stretched inside the high-speed and high-temperature air;
a collection device provided on a downstream side of the nanofiber generation device and configured to collect nanofibers generated by the nanofiber generation device;
a suction device provided on a downstream side of the collection device and configured to suck gas; and
a tubular-shaped guide member provided on the downstream side of the nanofiber generation device and on an upstream side of the collection device and configured to allow the high-speed and high-temperature air to pass therethrough,
wherein the elector nozzle is provided in front of the air nozzle at an angle such that a central axis of the elector nozzle is inclined at an acute angle with respect to a central axis of the air nozzle.

2. The nanofiber production apparatus as recited in claim 1, wherein the guide member is made of one selected from the group consisting of a wood material, stainless steel (SUS), aluminum, and polyethylene terephthalate (PET).

3. The nanofiber production apparatus as recited in claim 1, which further comprises a flow straightening device provided on the downstream side of the collection device.

4. The nanofiber production apparatus as recited in claim 1, wherein the collection device supports a filter substrate, the collection device being configured to allow nanofibers generated by the nanofiber generation device to be deposited on the filter substrate.

5. The nanofiber production apparatus as recited in claim 1, wherein the ejector nozzle is provided separately from the air nozzle, in such a manner as to eject the liquid polymer from a position on the downstream side of the air nozzle and on a lateral side of the high-speed and high-temperature air.

6. A method of producing nanofibers, comprising:
generating and ejecting high-speed and high-temperature air from an air nozzle;
ejecting a liquid polymer from an ejector nozzle;
holding the ejector nozzle and the air nozzle so as to be capable of adjusting a positional relationship therebetween, wherein the ejector nozzle is provided in front of the air nozzle at an angle such that a central axis of the ejector nozzle is inclined at an acute angle with respect to a central axis of the air nozzle;
supporting the ejector nozzle to be spaced apart from the high-speed and high-temperature air ejected from the air nozzle by a given distance, and providing the ejector nozzle on a downstream side of the air nozzle in such a manner as to allow the liquid polymer ejected from the ejector nozzle to be sucked into a gentle airstream formed around the high-speed and high-temperature air having an atmospheric pressure less than that of the high-speed and high-temperature air through a phenomenon that the high-speed and high-temperature air ejected from the air nozzle entrains surrounding air, so as to be gradually stretched without being broken into particles, and allow the liquid polymer stretched by the gentle airstream to be sucked into the high-speed and high-temperature air and further stretched inside the high-speed and high-temperature air;
allowing the high-speed and high-temperature air to pass through a tubular-shaped guide member downstream of the ejecting and upstream of gas sucking; and
collecting generated nanofibers.

7. The method of producing nanofibers as recited in claim 6, further comprising preparing the liquid polymer by dissolving a polymer in a solvent.

8. The method of producing nanofibers as recited in claim 6, further comprising preparing the liquid polymer by heating and melting a polymer.

9. The method of producing nanofibers as recited in claim 6, wherein the guide member is made of one selected from the group consisting of a wood material, stainless steel (SUS), aluminum, and polyethylene terephthalate (PET).

10. The method of producing nanofibers as recited in claim 6, further comprising flow straightening downstream of the collecting.

11. The method of producing nanofibers as recited in claim 6, wherein the collecting comprises allowing the generated nanofibers to be deposited on a filter substrate.

12. The method of producing nanofibers as recited in claim 6, wherein the ejecting of liquid polymer is performed from a position on a lateral side of the high-speed and high-temperature air.

* * * * *